United States Patent
Christol

[11] Patent Number: 6,107,923
[45] Date of Patent: Aug. 22, 2000

[54] METHOD AND DEVICE FOR DETECTING THE STATE OF AN AIR FILTER IN A HEATING AND/OR AIR-CONDITIONING INSTALLATION OF AN AUTOMOBILE

[75] Inventor: Eric Christol, Mont Saint Aignan, France

[73] Assignee: Chausson Service, Saint Ouen l'Aumone, France

[21] Appl. No.: 09/166,998

[22] Filed: Oct. 6, 1998

[30] Foreign Application Priority Data

Oct. 7, 1997 [FR] France ................................. 97 12495

[51] Int. Cl.⁷ .................................................. G08B 21/00
[52] U.S. Cl. .......................... 340/607; 340/626; 340/611; 55/323; 73/28.03; 454/193
[58] Field of Search ..................... 340/607, 606, 340/608, 614, 626, 611; 73/118.4, 28.01, 28.03; 55/311, 323, 327; 454/96, 111, 158, 191, 193

[56] References Cited

U.S. PATENT DOCUMENTS

| | | | |
|---|---|---|---|
| 3,696,666 | 10/1972 | Johnson et al. | 73/118 |
| 4,033,733 | 7/1977 | Nelson | 55/274 |
| 4,629,479 | 12/1986 | Cantoni . | |
| 4,702,753 | 10/1987 | Kowalczyk | 55/267 |
| 4,751,501 | 6/1988 | Gut . | |
| 4,803,471 | 2/1989 | Rowland | 340/626 |
| 5,141,309 | 8/1992 | Worwag | 356/72 |
| 5,205,156 | 4/1993 | Asano et al. | 340/607 |
| 5,351,035 | 9/1994 | Chrisco | 340/607 |
| 5,668,535 | 9/1997 | Hendrix et al. | 340/607 |
| 5,681,988 | 10/1997 | Koch et al. | 73/118.1 |
| 5,850,183 | 12/1998 | Berry, III | 340/607 |

FOREIGN PATENT DOCUMENTS 0 623 376   11/1994   European Pat. Off. .
40 37 685   6/1992    Germany .

OTHER PUBLICATIONS

French Search Report dated Jun. 4, 1998.

*Primary Examiner*—Daniel J. Wu
*Assistant Examiner*—Anh La
*Attorney, Agent, or Firm*—Morgan & Finnegan LLP

[57] ABSTRACT

The invention provides a method and device for detecting the state of an air filter in a ventilation system of the passenger compartment of an automobile vehicle. The installation is put into operation in a given mode and a parameter of an air flow emitted into the passenger compartment by an air nozzle of the installation is measured by means of a measurement device filled with a collector. The measured value of the parameter is then compared with a reference value, to determine whether or not the filter needs to be replaced.

24 Claims, 1 Drawing Sheet

METHOD AND DEVICE FOR DETECTING THE STATE OF AN AIR FILTER IN A HEATING AND/OR AIR-CONDITIONING INSTALLATION OF AN AUTOMOBILE

FIELD OF THE INVENTION

The invention relates to the determination of the state of an air filter in a ventilation system (heating and/or air-conditioning installation) of the passenger compartment of an automobile vehicle.

BACKGROUND OF THE INVENTION

In an installation of this kind, an air filter is usually provided to filter the air passing into the installation. The filtered air is then treated and distributed into the passenger compartment by means of one or more nozzles disposed in selected positions in the passenger compartment.

Progressively during use of the installation the filter becomes dirty, causing it to become fouled and causing pressure losses prejudicial to the proper operation of the installation. Moreover, the fouling is often a source of disagreeable smells emitted into the passenger compartment when the installation is in operation. It is also possible that the filter may deteriorate with time and become torn or holed.

Usually the filter is contained in a replaceable cartridge which can be exchanged for a new cartridge when the filter is blocked, saturated or has deteriorated. For this purpose it is generally necessary for the operator to gain access to the installation, either in the engine compartment or in the passenger compartment, then to open an access flap and remove the cartridge to determine its condition, usually by a simple visual examination.

Because the filter is often placed in a position which is difficult to get to, these operation required tome and may prove useless if the operator decides, after examination of the filter, that the latter is still in good condition and therefore does not need to be exchanged.

The invention aims to avoid the above-mentioned disadvantages.

In particular, it is one object of the invention to provide means making it possible to determine the state of an air filter in an installation of the above kind, without it being necessary to dismount the filter.

DISCUSSION OF THE INVENTION

The invention proposes a method for detecting the state of an air filter in a ventilation system of the passenger compartment of an automobile vehicle, in which the installation is put into operation in a given mode, a parameter of a flow of air emitted into the passenger compartment by an air nozzle of the installation is measured, and the measured value of this parameter is compared with a reference value, which makes it possible to determine whether or not the filter needs replacing.

Thus, the invention relies on the measurement of a parameter of a flow of air delivered by an air nozzle of the installation when the latter operates under well defined conditions, and on a comparison of the parameter thus measured with a reference value.

Because the said measurement is performed under standard, and therefore reproducible, conditions, corresponding to a given mode of operation, it is possible to perform an objective comparison of the measured value and the reference value. This reference value corresponds to the theoretical value measured under the same conditions, and for the same type of vehicle, with a new filter which is not fouled and has not deteriorated.

The parameter is preferably a pressure value of the air flow. However, a quantity of the air flow delivered, or a flow rate of the air flow may be selected.

The air nozzle used for the measurement of the parameter is preferably a ventilator nozzle in the dashboard, for example the ventilator nozzle located at the driver's side.

The mode of operation of the installation selected for the measurement of the parameter is preferably a mode of ventilation in which the air flow is delivered at maximum speed.

According to another characteristic of the invention, the measurement of the parameter is performed over a limited time period, typically of the order of several seconds, after stabilisation of the measurement.

The reference value corresponds to defined measurement conditions which depend, in particular, on the type of vehicle, the air nozzle through which the flow of air is emitted and the mode of operation of the installation during measurement.

Preferably the measured value and the reference value are compared, for example, with the aid of a table, a graph, a performance chart, or the like.

Another aspect of the invention relates to a device for carrying out the aforesaid method.

The said device advantageously comprises a collector suitable for application to the outlet of an air nozzle of the installation to collect the flow of air, and a measurement device connected to the collector and adapted to measure a parameter representative of the flow of air.

Preferably the collector comprises a casing having a contact face with a shape adapted to that of the air nozzle and an outlet connected to the measurement device by a flexible hose.

Preferably the casing is removable from the hose, which makes it possible always to use a casing appropriate to the type of vehicle.

The contact fact of the casing is suitably fitted with a deformable covering around its periphery which is impermeable to air, for example a foam of plastic material, so as to ensure that all the air flow delivered by the air nozzle is collected in the collector casing.

According to another advantageous characteristic of the invention, the measurement device comprises display means suitable for displaying the value of the parameter measured. This allows the operator to read the value of the parameter directly for example by numerical display means, once the measurement is stabilised.

Preferably the measurement device is a device for measuring air pressure, such as a manometer.

Alternately, or in addition, said device may measure an amount of air delivered, or the velocity of the air flow.

BRIEF DESCRIPTION OF THE DRAWING

In the following description, given by way of example, reference is made to the attached drawing in which the single FIGURE shows diagrammatically a detection device according to the invention during the measurement of a flow of air delivered by an air nozzle of a ventilation system of the passenger compartment of an automobile vehicle.

DESCRIPTION OF THE PREFERRED EMBODIMENT OF THE INVENTION

Figure 1:
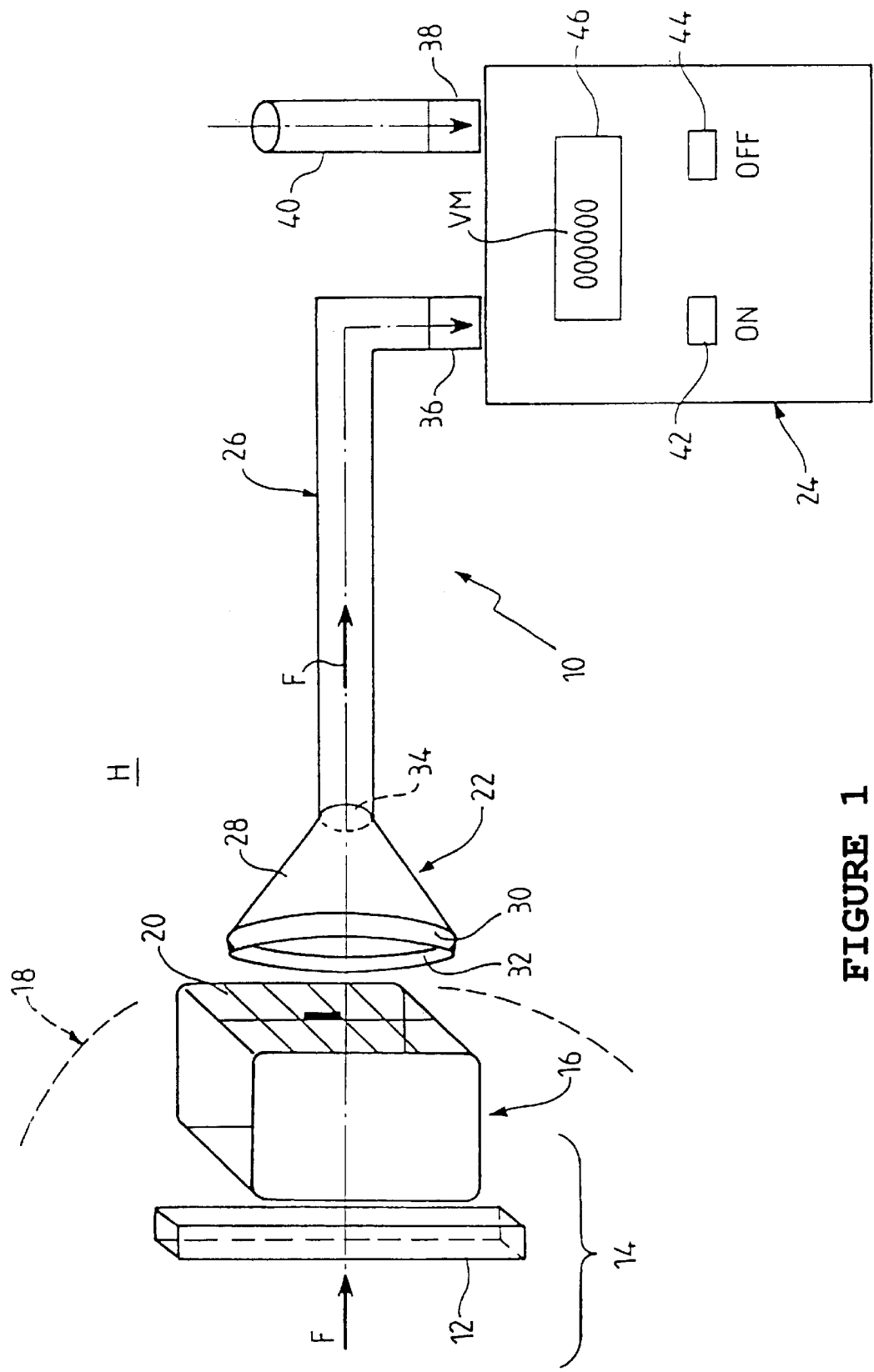

The detection device 10 shown in the drawing is designed to detect the state of a filter 12 forming part of a heating and/or air-conditioning installation 14 of the passenger compartment H of an automobile vehicle, The filter 12 is designed to filter a flow of air F which enters into the installation and which is then treated (heated, cooled or conditioned) by the latter before being distributed in the passenger compartment through one or more selected ventilation nozzles.

The said nozzles include, in particular, a ventilator nozzle 16 housed in the dashboard 18 of the vehicle, In this example the ventilator nozzle 26 is located on the driver's side, that is to say at the driving position. The ventilator nozzle 16 comprises a movable grill 20 able to direct the flow of air in a chosen direction in the passenger compartment. In addition, the grill may be closed by appropriate means which are will known.

The detection device 10 comprises a measuring collector 22 connected to a measuring device 24 by a flexible hose 26.

The collector 22 comprises a casing 28, in this example having a conical shape, having a contact face 30 having a shape adapted to that of the ventilator nozzle 16. The said contact face is open and fitted on its periphery with a deformable covering 32 which is impermeable to air, for example a foam of plastic material. Thus the collector may be applied tightly against the grill 20 of the ventilator 16 to collect all the flow of air escaping from the grill 20 when the installation 14 is in operation.

The contact face 30 of the collector 22 may be covered by a deformable cover which i impermeable to air around its periphery but permeable to air in the region of the open face of the collector. In this way any dirt may be prevented form entering without interfering with the passage of the total flow of air into the collector.

The casing 28 also comprise an outlet orifice 34 connected to one end of the flexible hose 26. The other end of the hose is connected to a connection piece 36 of a measuring device 24. The latter also comprises another connection piece 38 to which is attached an air intake 40 in communication with the air contained in the passenger compartment H of the vehicle.

Preferably the casing 28 is removable from the hose 26 so as to be able to accomodate casings having shapes and cross-sections adapting to the shapes of different nozzles.

In the embodiment shown, the device 24 is a differential manometer which measures the pressure of the flow of air F collected by the collector 22 and led into the device itself by the hose 26. The said device possesses a commence operation indicator 42 ("ON "indicator) and a stop indicator 44 ("OFF "indicator). The device 24 also comprises a digital display unit 46 showing directly the measured value VM of the parameter (in this case the pressure) measured by the device.

An example of the detection method using the device 10 will now be described.

The measurement of the parameter of the air flow (here the pressure) should be performed under perfectly reproducible standard condition which depend, in particular, on the type of vehicle the air nozzle through which the flow of air is delivered and the mode of operation of the installation during the measurement.

In the example, the measurement of the parameter is performed in the ventilation mode, that is to say in a configuration in which all the flow of air is cold and is distributed only by the ventilation nozzles located in the dashboard 18 of the vehicle. For the measurement all the ventilator nozzles in the dashboard are closed except for the ventilator nozzle 16 located at the side of the driver. As a result, the flow of air cannot pass into the passenger compartment except through ventilator nozzle 16.

The measurement is performed in this case in a configuration in which the flow of air is delivered at a maximum speed, the engine of the vehicle being turned on and rotating at a predefined rate, for example at 1500 revolutions per minute.

The installation being switched on in this operating mode, it suffices to start the device 24 and to place the collector 22 in close contact with the grill of the ventilator nozzle 16 to collect all the air flow.

The operator observed directly the measured value VM on the display unit 46 and notes the value obtained after stabilisation. Usually this operation takes only a few seconds. It then suffices for him to compare the measured value VM with a reference value VR which is given to him by a table, a graph, a performance chart or the like. The said value VR represents the theoretical value obtained under the same conditions when the filter is in a perfect condition. The operator should then compare the value VM with the value VR to determine the condition of the filter and to decide whether or not it is necessary to replace this filter by a new filter.

By way of example, the value VR may be 6 millibars and it may be specified that the filter should be changed when the value VM is equal to or less than 4 millibars.

The invention is not limited to the embodiment described above and its scope extends to other alternatives. In particular, detection of the state of the filter may be performed using another parameter of the air flow, for example the amount of air delivered or, alternatively, the velocity of the air flow, Thus, by means of the invention, the state of the filter, for instance its clogging or its structural deterioration, can easily be established.

What is claimed is:

1. A method of detecting the state of an air filter in a ventilation system of a passenger compartment of an automobile, comprising:

putting the system into a given mode of ventilation;

measuring a value of a parameter of a flow of air emitted by a ventilator nozzle located in the passenger compartment; and comparing the measured value with a reference value to determine whether the filter needs replacing.

2. A method according to claim 1, wherein the parameter measured is pressure.

3. A method according to claim 1, wherein the parameter measured is volume.

4. A method according to claim 1, wherein the parameter measured is velocity.

5. A method according to claim 1, wherein the mode of operation selected delivers the flow of air at maximum speed.

6. A method according to claim 1, wherein the measurement of the parameter is performed after stabilization of the parameter's value.

7. A method according to claim 1, wherein the reference value corresponds to defined measurement conditions.

8. A method according to claim 7, wherein the measured value and the reference value are compared.

9. The method of claim 1, wherein the reference value is a predefined value.

10. The method of claim 1, wherein the reference value corresponds to a value selected from one of a table, graph and performance chart.

11. A device for detecting the state of an air filter in an automobile ventilation system of a passenger compartment, comprising:

an air flow collector adapted for application to a ventilator nozzle located in the passenger compartment; and a measurement device connected to the air flow collector and adapted to measure a value of a parameter representative of an air flow.

12. A device according to claim 11, wherein said collector comprises:

a casing having a contact face with a shape adapted to that of the ventilator nozzle; and an outlet connected to the measurement device by a flexible hose.

13. A device according to claim 12, wherein the casing is removable form the hose.

14. A device according to claim 12, wherein the contact face of the casing is fitted with a deformable covering around its periphery which is impermeable to air.

15. A device according to claim 12, wherein the contact face fo the casing is fitted with a deformable covering which is impermeable to air only around is periphery.

16. A device according to claim 11, wherein the measurement device further comprises a display adapted to display the measured parameter.

17. A device according to claim 11, wherein the measurement device is adapted to measure pressure.

18. A device according to claim 11, wherein the measurement device is adapted to measure volume.

19. A device according to claim 11, wherein the measurement device is adapted to measure velocity.

20. The device according to claim 11, wherein the measured value is compared to a reference value to determine the state of the air filter.

21. The device according to claim 20, wherein the reference value is a predefined value.

22. The device according to claim 20, wherein the reference value corresponds to a value selected from one of a table, graph and performance chart.

23. A device for detecting the state of an air filter in an automobile ventilation system of a passenger compartment, comprising:

an air flow collector, the air flow collector having an input and an output, the input being adapted to collect an air flow form a ventilator nozzle located in the passenger compartment; and a measurement device to measure a value of an air flow parameter of the ventilation system, the measurement device being adapted to connect to the output of the air flow collector wherein the measured value is compared to a reference value to determine the state of the air filter.

24. A device for detecting the state of an air filter in an automobile ventilation system of a passenger compartment, comprising:

means for collecting a flow of air form a ventilator nozzle located in the passenger compartment;

means for measuring a value of a parameter of the flow of air; and means for comparing the value measured with a reference value to determine the state of the air filter.

* * * * *